United States Patent [19]

Gunning

[11] 4,205,350
[45] May 27, 1980

[54] REPRODUCTION SCANNING SYSTEM HAVING INTERMEDIATE STORAGE BETWEEN INPUT AND OUTPUT SCANNING STATIONS

[75] Inventor: William F. Gunning, Los Altos Hills, Calif.

[73] Assignee: Xerox Corporation, Stamford, Conn.

[21] Appl. No.: 893,721

[22] Filed: Apr. 5, 1978

Related U.S. Application Data

[63] Continuation-in-part of Ser. No. 776,152, Mar. 10, 1977, abandoned.

[51] Int. Cl.$^2$ .......................... H04N 1/04; G01J 1/20; G02B 27/17; G03G 15/28
[52] U.S. Cl. ..................................... 358/296; 250/235; 350/6.7; 355/8; 358/285
[58] Field of Search .................. 256/296, 300, 285; 355/8; 350/6.5, 6.6; 250/235; 346/160

[56] References Cited

U.S. PATENT DOCUMENTS

| | | | |
|---|---|---|---|
| 3,723,646 | 3/1973 | Behane et al. | 358/300 |
| 3,800,076 | 3/1974 | Koizumi | 358/300 |
| 3,922,485 | 11/1975 | Starkweather et al. | 350/7 |
| 3,970,359 | 7/1976 | Starkweather | 250/236 |
| 3,973,825 | 8/1976 | Starkweather | 358/8 |
| 4,008,958 | 2/1977 | Kingsland | 355/8 |
| 4,012,585 | 3/1977 | Chen | 358/302 |
| 4,027,961 | 6/1977 | Starkweather | 358/300 |
| 4,046,471 | 9/1977 | Branham et al. | 358/300 |
| 4,051,536 | 9/1977 | Roetling | 358/300 |

Primary Examiner—Daryl W. Cook
Attorney, Agent, or Firm—Irving Keschner

[57] ABSTRACT

A reproduction scanning system having intermediate storage between input and output scanning stations wherein an input document is scanned in first and second directions, the first direction being orthogonal to said second direction, and the electrical signals representative of information on said scanned document being stored on an intermediate storage member for storage, signal processing or data manipulation. The information stored in the storage member may be read out and reproduced on a reproducing medium. Other system features include input scan reversal for alternate bound pages during bound volume scanning, synchronization of the system by a clock associated with the storage member, input/output interleaving with a print interrupt feature, image centering and edge fadeout for image reduction, and independent magnification demagnification by separately variable raster spacing.

7 Claims, 10 Drawing Figures

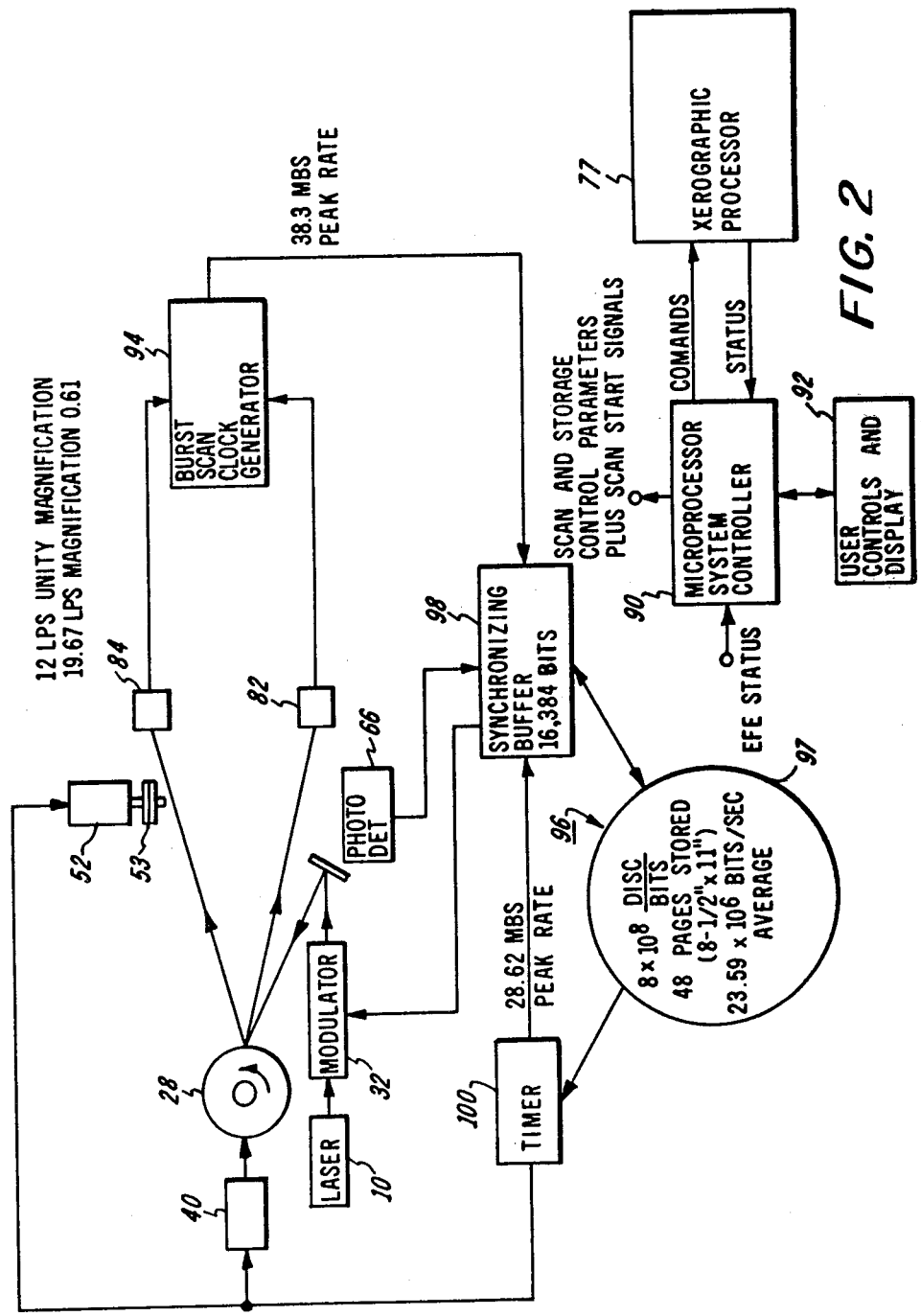

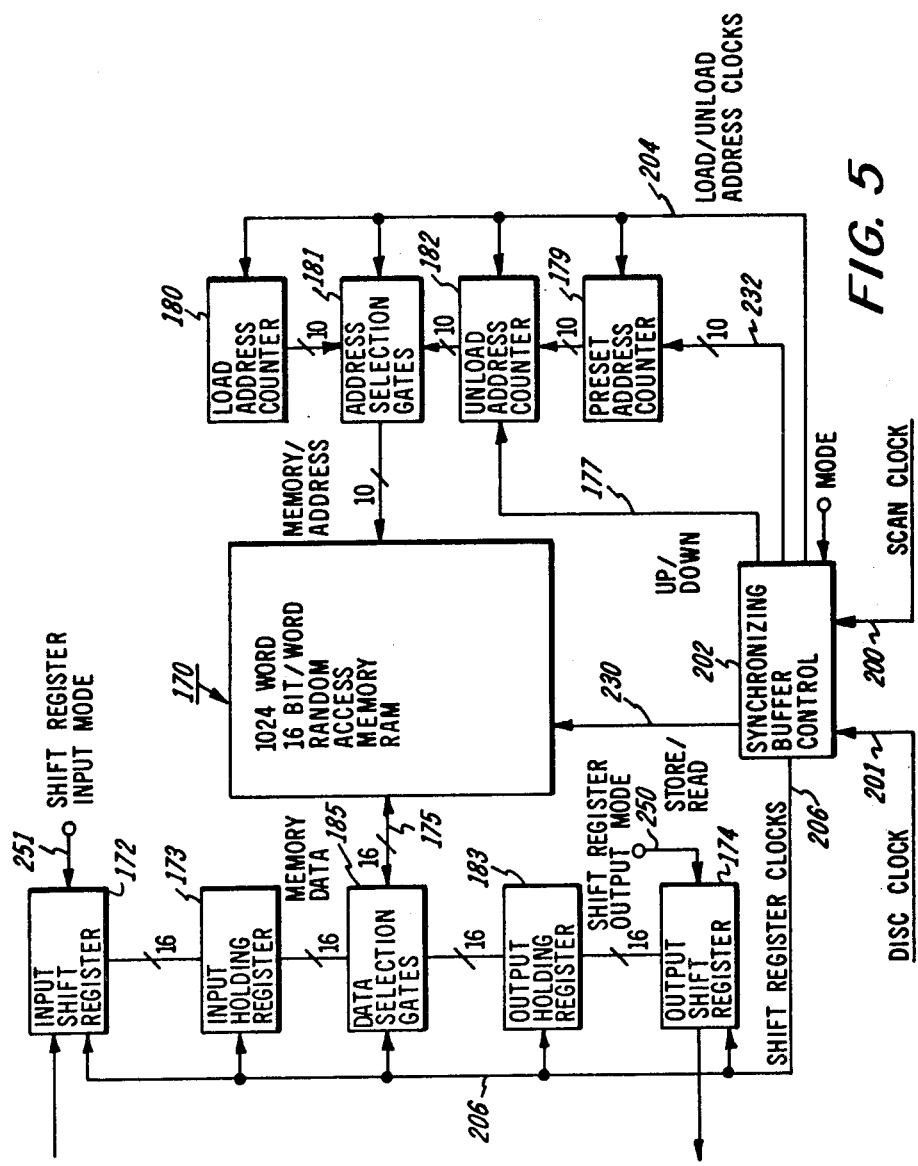

REPRODUCTION SCANNING SYSTEM HAVING INTERMEDIATE STORAGE BETWEEN INPUT AND OUTPUT SCANNING STATIONS

RELATED APPLICATIONS

This application is a continuation-in-part application of Application Ser. No. 776,152 filed Mar. 10, 1977 now abandoned.

BACKGROUND OF THE INVENTION

Laser scanning techniques for writing or printing on a medium sensitive to the laser beam have been disclosed in the prior art as shown, for example, in U.S. Pat. No. 3,922,485. In general, the laser beam is intensity modulated in accordance with information to be printed on a receiving medium, the modulated laser beam being directed to a rotating scanner, or reflector, such as a multi-faceted polygon. The rotating scanner in turn causes the modulated laser beam to scan, in sequence, across a sensitive medium located a distance away from the scanner. The information contained in the intensity modulated laser beam can be directly written on the medium if the medium is sensitive to the laser beam, or in an alternative embodiment, the laser beam can selectively discharge a charged insulating or semiconducting surface, such as photoconductor, in accordance with the intensity of the beam. In the alternative embodiment, the degree of charge dissipation corresponds to the information contained in the intensity of the laser beam. The areas of the medium which are not discharged by the laser beam are subsequently developed, for example, by standard xerographic techniques.

Present day copiers which are commercially available which utilize the xerographic process include a platen upon which the document to be reproduced is placed, the platen being flat or curved. The document is generally flood illuminated or scanned with light and the reflections therefrom are imaged via a copy lens to a charged photoconductive medium to discharge the medium in accordance with the image formed on the document.

The Telecopier ® 200, a facsimile transceiver manufactured by the Xerox Corporation, Stamford, Connecticut, directs reflections from a laser scanned document onto a photosensitive transducer, the electrical signal output thereof being transmitted to another or remote location and used to modulate a laser beam to reproduce the scanned document. However, the Telecopier 200 is generally not considered a copier type device since, inter alia, a scanning platen and other copier features are not available.

Although copiers now commercially available are not adapted to utilize scanning techniques to scan a document placed on the copier platen line by line to produce a serial bit stream corresponding to the scanned information (i.e. a raster type scanning system), it would be advantageous if such copiers or other reproduction devices available could be modified to incorporate the laser printing technique disclosed, for example, in the aforementioned patent, the modified copier thus requiring a system which provides for two-dimensional raster input scanning. A system for two-dimensional raster input scanning which utilizes a laser, is described, for example, in U.S. Pat. No. 3,970,359. Copending application Ser. No. 546,478 filed Feb. 3, 1975, now Patent No. 4,012,585 and assigned to the assignee of the present invention, provides a flying spot scanning system which is capable of scanning an unmodulated beam to a reading station for reading a stationary document and a modulated beam to an imaging station for, inter alia, reproducing the scanned document thereat.

The availability of a copier or other reproduction device which utilizes two-dimensional input scanning, such as the raster type input scanning of a document placed on a platen as described hereinabove and laser scanning techniques for writing on a laser sensitive medium would provide many advantages inherent with the use of lasers and non-floood illuminating input scanning techniques, such as increased copying speeds and resolution. In particular, it would be advantageous if an intermediate storage medium was provided between the input and output scanning stations (in this regard, the output scanning station may be located at a position remote from the input scanning station) to allow for manipulation and storage of the scanned information, and, in particular, to provide for electronic precollation which electronically arranges representations of images to allow collated sets of documents to be reproduced. Other desirable features of such a copier would include input scan reversal for alternate bound pages during bound volume scanning, synchronization of the system by a clock associated with the storage member, a synchronous system reducing the size and cost of a synchronizing buffer associated therewith, input/output interleaving with a print interrupt feature, image centering and edge fadeout for image reduction, and independent magnification/demagnification by separately variable raster spacing.

SUMMARY OF THE PRESENT INVENTION

The present invention provides a reproduction scanning system having intermediate storage between input and output scanning stations, the output scanning station being either at the same location as the input scanning station or remote therefrom, wherein an input document is scanned in first and second directions, the first direction being orthogonal to said second direction, and the electrical signals representation of information on said scanned document being stored on an intermediate storage member, such as a magnetic or optical disc, for manipulation, storage, or other signal processing via a synchronizing buffer. The information stored in the storage member may be read out via the synchronizing buffer and reproduced on a reproducing medium which may, for example, be incorporated in a xerographic processor. Other system features include input scan reversal for alternate bound pages during bound volume scanning, synchronization of the entire system by a clock associated with the storage member, input/output interleaving with a print interrupt feature, image centering and edge fadeout for image reduction and independent magnification/demagnification by separately variable raster spacing.

OBJECTS OF THE PRESENT INVENTION

It is an object of the present invention to provide a reproduction scanning system having intermediate storage between input and output scanning stations.

It is a further object of the present invention to provide a reproduction scanning system having a storage member for writing information thereon, said input information being derived from an input scanning station and directed to an output scanning station wherein the information is reproduced.

It is still a further object of the present invention to provide a reproduction scanning system wherein an input document is scanned in mutually orthogonal directions, the scanned information being stored in a storage member, such as a magnetic disc memory, via a synchronizing buffer, the stored information being read out from the storage member through the synchronizing buffer and directed to an output scanning station wherein the information is reproduced.

It is still an object of the present invention to provide a system of the type described hereinabove wherein the input scan may be reversed, electromechanically in one direction and electronically in the other direction when an alternate page in a bound volume is being input scanned.

It is still a further object of the present invention to provide a system of the type described hereinabove wherein the system is synchronized by a clock associated with a magnetic disc storage member.

It is a further object of the present invention to provide a system of the type described hereinabove wherein the reproduced image is centered by using edge fadeout techniques when an input image is to be reduced in size on an output medium, the reduced image being smaller in size than the output medium.

It is still a further object of the present invention to provide for magnification or demagnification in one scan direction which is independent of the magnification or demagnification in the other scan direction in the system described hereinabove by separately varying the spacing of the input scan i.e. variable raster spacing.

It is an object of the present invention to provide a system of the type described hereinabove wherein input scanning of a first original (document) and output printing (scanning) thereof is interleaved and includes a print interrupt feature to allow a second original or set of originals to be input scanned.

BRIEF DESCRIPTION OF THE DRAWINGS

For a better understanding of the invention as well as other objects and further features thereof, reference is made to the following description which is to be read in conjunction with the following figures wherein:

FIG. 2 is a simplified block diagram of the overall system of the present invention;

FIG. 5 illustrates in more detail the operation of the synchronizing buffer which comprises a portion of the system of the present invention;

DESCRIPTION OF THE PREFERRED EMBODIMENT

Figure 1:
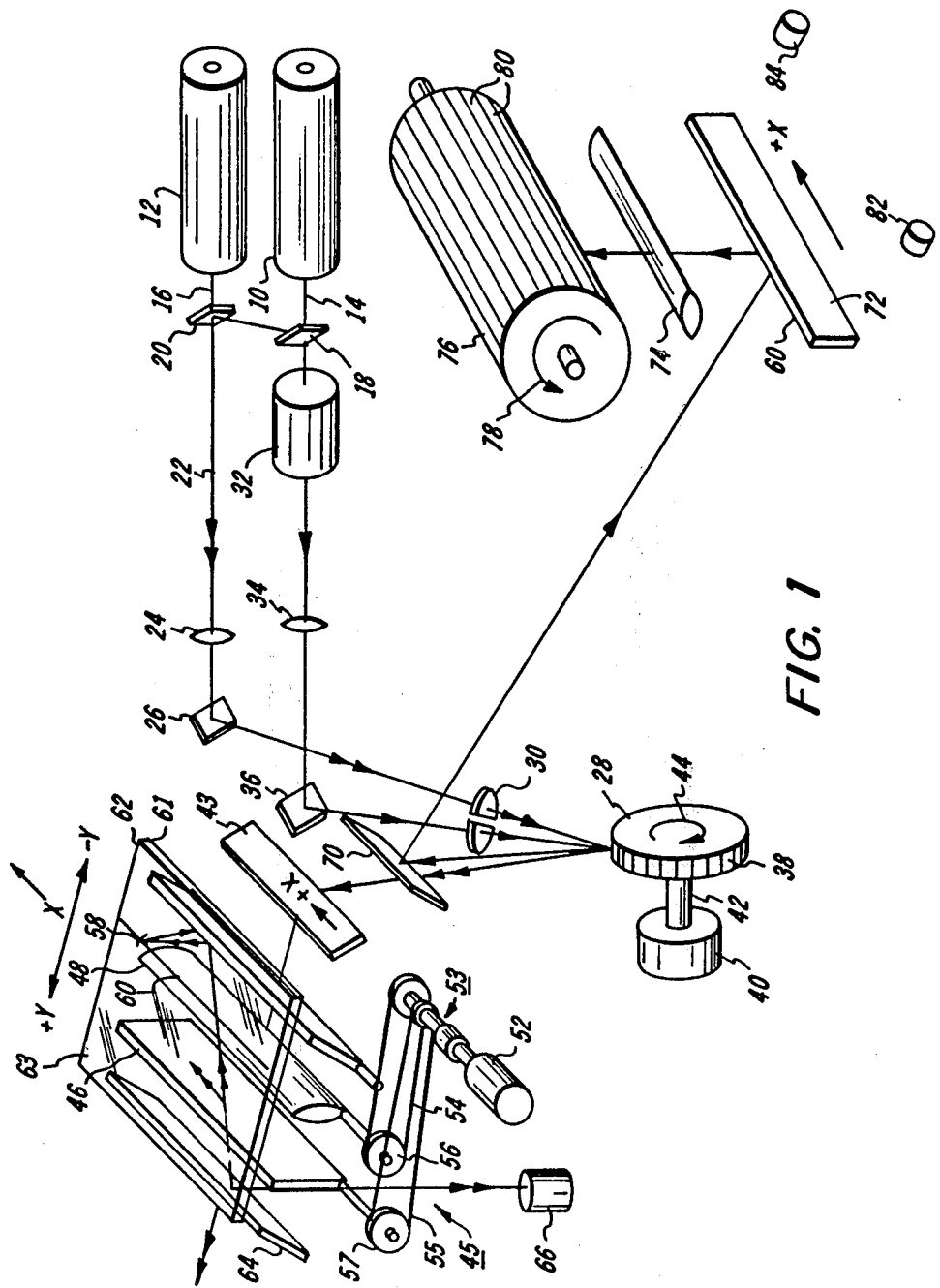
FIG. 1 shows in simplified form, an optical arrangement which may be utilized in the present invention.

Referring now to FIG. 1, a simplified representation of an optical system which may be utilized in the present invention is shown. Light sources 10 and 12 provide original beams 14 and 16, respectively, for utilization by the scanning system. Light sources 10 and 12 are preferably lasers which provide collimated beams of monochromatic light, laser 10 comprising a helium-cadmium laser which generates blue laser light at a wavelength of 4416A and laser 12 comprises a helium-neon laser which generates red laser light at a wavelength of 6328A. The use of the two laser beams ensures that the document scanner is not insensitive at the wavelengths of lasers 10 or 12 and hence, the system is suitable for detecting light fluxes reflected from multi-colored documents in addition to the fact that a choice of laser beams is available for forming information on a laser sensitive medium. Light beam 14 is incident upon beam splitter 18 which directs a portion of light beam 14 to dichroic mirror 20. Light beam 16 is also incident on dichroic mirror 20, which is positioned to reflect the flux in beam 14 as a combined beam 22 (combined with transmitted beam 16). Beam 22 is incident upon pre-image cylinder lens 24 which transmits the beam to mirror 26 which directs the beam to a rotating scanner 28 via a split doublet 30. The portion of beam 14 transmitted by beam splitter 18 is incident on modulator 32 which may either be an acousto-optic or electro-optic type device, the output thereof being incident on scanner 28 via pre-image lens 34, mirror 36 and split doublet 30, the split doublet 30 allowing the separate beams incident thereon to be focused on the platen 62 or drum 76. Rotating scanner 28, shown as comprising a polygon having a plurality of reflecting facets 38, is driven by motor 40 via drive shaft 42.

Scanner 28 rotates in the direction of arrow 44 causing the laser spot (combined laser beam) incident thereon to deflect in the x direction at mirror 43, the output beam being directed to a movable scanning assembly 45, shown in a simplified representational form, which comprises mirror 46, cylinder lens 48, mirror 50, bidirectional motor 52 having a stepped pulley 53 on its output shaft, cables 54 and 55 and pulleys 56 and 57. Elements 48 and 50 are rigidly affixed to cable 54, element 46 being affixed to cable 55, element 46 being driven at ½ the speed of elements 48 and 50 to maintain a constant focal length between the platen 62 and mirror 43. This technique is generally referred to as ½ rate mirror scan, such a technique being disclosed in U.S. Pat. No. 3,970,359, the teachings of which that are necessary for an understanding of the present invention being incorporated herein by reference. A scan spot 58 is produced which moves along scan line 60, formed in the x-direction at platen 62, as scanner 28 continues to rotate. Although not shown in the figure, a document, or a page in a bound volume, to be scanned is placed face down on the top surface of transparent platen 62. Since motor 52 is bidirectional, the direction of y scan is selectable by an operator by appropriate activation of buttons formed on an operator's panel 92 (shown schematically in FIG. 2) which in turn causes a system controlling microprocessor 90 (FIG. 2) to generate the appropriate control signals. As will be set forth hereinafter, the particular scan direction selected is determined by the type of input being scanned, alternate pages of a bound volume generally requiring reversal of the normal scan direction.

When a document is placed face down on platen 62, it is scanned by the two color laser beam spots 22, the document reflecting the incident radiation flux in accordance with the document information being scanned. A fraction of the reflected flux is detected by one or more photomultiplier tubes (or other photosensitive device) represented by a single photomultiplier tube 66 located under the platen 62 via mirror 64. The photomultipliers convert the variation in intensity of the reflected laser beam into electrical information signals which may be transmitted to an intermediate storage device 96 via a synchronizing buffer 98 (shown in FIGS. 2 and 4) and hence to a recording device via the intermediate storage device, synchronizing buffer and modulator 32 for producing a copy of the document scanned as will be explained hereinafter. The scanner 28 and scan system 45 are arranged to scan the material on platen 62 in a manner whereby a plurality of scan lines 60 are generated across the width of platen 62 such that the material on the transparent platen is completely scanned. In essence, the scanning path is as follows. The beam reflected from mirror 43 passes under elements 48 and 50, is reflected by mirror 46 (approximately one-half the light is reflected, the other half being lost) and passes through lens 46 and is reflected by mirror 50 to platen 62, light reflected from the document on platen 62 is incident on mirror 50, passes through lens 48 and is incident on mirror 46, approximately half the light passing therethrough and being incident on mirror 64. This light beam is then reflected down to photomultiplier tube 64.

It should be noted that the present invention can be adapted to utilize other input scanning techniques, such as arrays of phototransistors, charge coupled devices (CCD) or MOS photodiodes. The use of either type array (the reflections from the document to platen 62 being imaged thereon) in image sensors has been disclosed in the prior art as for example, in an article by R. Melen, in *Electronics*, May 24, 1973, pages 106–111. A particular scanning array which may be utilized is disclosed in copending Application Ser. No. 793,009, filed May 2, 1977 and assigned to the assignee of the present invention. As disclosed in that application, a multiplicity of linear arrays are provided, the arrays being offset from one another in the direction of scan to permit an entire line to be scanned. The image data from the arrays is buffered until a line is completed when readout is initiated. The Y-scanning of the document is accomplished by utilizing a displaceable scanning mechanism for movement back and forth underneath a platen. The teachings in this patent application necessary for an understanding of this alternative scanning approach is incorporated herein by reference.

Although the input scanning techniques described hereinabove are fixed platen scanners (document stationary on platen) it is to be noted that the system can be arranged such that the input type document moves along the Y direction of the platen 62, the input scanning mechanism thereby being stationary.

As shown in FIG. 1, the single beam reflected from mirror 36 is also incident on the facets 38 of scanner 28 and caused to scan mirror 70 which directs the beam to mirror 72, mirror 72 in turn scanning the incident beam on cylinder lens 74. Cylinder lens 74 focuses the beam on a recording member 76, such as a xerographic drum, rotating in the direction of arrow 78. A plurality of scan lines 80 are formed on the surface of drum 76 in a similar spatial relationship (the reproduction not being accomplished in time synchronism since the output from the photomultiplier tubes are initially directed to the intermediate storage device 96 via a synchronizing buffer 98 in the preferred embodiment) with the information being scanned on platen 62 to thereby reproduce a copy of the image on drum 76 in a manner as described in the aforementioned U.S. Pat. No. 3,922,485. A start of scan detector 82 is provided adjacent to mirror 72 to provide a signal when the scan on drum 76 (a portion of the xerographic processor 77 shown in FIG. 2) is initiated and end of scan detector 84 is provided adjacent mirror 72 to provide a signal when each scan line is completed. It should be noted that although a single polygon scanner is shown for both input and output scanning, separate polygon scanners which are synchronously driven may be utilized. It should be noted that the teachings of the aforementioned copending application Ser. No. 546,478 which provide, inter alia, for scanning an unmodulated laser beam at a reading station for reading a stationary document thereat and directing a modulated laser beam to an imaging station for reproducing the document image thereat and which utilizes single scanner element necessary for an understanding of the present invention is incorporated herein by reference.

FIG. 2 is an optically simplified version of FIG. 1 and further shows, in a simplified form, the electronic input scanning signal processing, storage and output scanning functions of the present invention.

The speed of drum 76 of xerographic processor 77 is assumed to be 12"/second for purposes of the calculations to follow but is not intended to limit the scope of the present invention. The paper feed for both simplex (printing on one side of the output paper) and duplex operation (duplex operation, printing on both sides of the output paper) is provided, for example, by the Xerox 4000 copier manufactured by the Xerox Corporation, is initiated on demand under control of the system microprocessor controller 90. It should be noted that the function of microprocessor 90 is that of system management and when properly programmed, controls the operating sequence of the entire system of the present invention. It also sets up the appropriate operating parameters derived from user controls on panel 92, such as magnification ratio, mode of operation, normal or reverse scanning mode, etc. In general, the system controlled issues appropriate commands to xerographic processor 77, receives status signals therefrom, issues scan and storage control parameters and the start of scan signals, receives status signals from the rest of the system and, of course, interacts with the user panel 92. Any properly programmed microprocessor, such as the Intel 8080 or the Motorola 6800 or minicomputers such as the Nova series manufactured by the Data General Corporation, Southboro, Massachusetts, can perform these functions. Since the present invention is directed to the general interrelationship of the system elements, a specific description of the microprocessor system controller 90 and the operating software therefor is not set forth herein.

It should be noted that the dimensions and the calculations that follow are approximate and are set forth for illustration purposes only and are not intended to limit the scope of the present invention.

In one embodiment, input scanning is provided on a flat platen 62 (14"×17" for example), the scan mirrors moving across the short (14 inch) dimension of the platen as shown in FIG. 1 to provide for y scanning.

The X direction scanning in the long (17 inch) dimension in this embodiment, is produced by a multifaceted rotating polygon 28 having 26 facets. The actual total length of scan is 17.85 inches, which provides 0.43 inches over scan at each end of the 17" platen which allows the scan clock generator 94 to be resynchronized prior to the start of the next scan line.

Resolution in the X and Y directions of scan is assumed to be equal. That is, the bits/inch (pixels/inch) in the X direction equals the lines/inch in the Y direction for both input and output scanning.

For a given output paper size, the output scan density (this refers to resolution and not to optical density) is constant, with reduction in image size being accomplished by reducing the input scan density (resolution), the number of pixels per output page being independent of the reduction ratio selected. Reducing the input scan density in the Y direction is accomplished by increasing the Y scan mirror velocity by operator selection of a desired magnification value (the range, for example, being from 1.0 to 0.61), the input scan density in the X direction being reduced by decreasing the number of bits/inch in the X-scan direction by varying the scan clock generator 94 by the magnification ratio selected. This allows independent control over the reduction/magnification in the X and Y directions if desired and makes good use of the capacity and bandwidth of the storage system 96, the storage system preferably utilizing a magnetic disc 97. In this regard, it should be noted that alternate image storage media (and associated read-out systems) can be utilized in the present invention. For example, a video or optical disc system for recording and reading out information (wherein lasers may be utilized to record information on the disc and wherein lasers are utilized to read the information formed on the disc) have been disclosed in the prior art and may be utilized in the present invention. A particular write once optical disc system which may be utilized for archival storage purposes is disclosed in copending Applications U.S. Ser. No. 785,884, filed Apr. 8, 1977, now U.S. Pat. No. 4,122,551 and Ser. No. 828,801, filed Aug. 29, 1977 now U.S. Pat. No. 4,130,898. A read-write optical disc memory is disclosed, for example, in an article by D. Chen, *Applied Optics*, October, 1972, Vol. 11, No. 10, Pages 2133-2139, the teachings of which may be adapted to the present invention. In general, the output from the input scanning device can be utilized directly to modulate a laser, via synchronizing buffer 98, the laser in turn writing the appropriate information on the optical disc. The information read from the optical disc can be stored in synchronizing buffer 98, manipulated or otherwise processed and then coupled to the printing portion of the disclosed system. Other alternate image storage media may utilize magnetic bubbles or CCD technologies, for example.

Images scanned and readout by photodetector 66 are stored in uncompressed, binary, digital format preferably on a dual platter, 4 track parallel, moving arm magnetic disc system 96 via synchronizing buffer 98, the tracks preferably being formed in a helical pattern. The total capacity of the disc 96 preferably is selected to be approximately $8 \times 10^8$ bits which allows storage of 48, $8\frac{1}{2} \times 11''$ impressions (pages) scanned at approximately 423 lines/inch. The average data bit rate to the disc system 96 (the system including magnetic disc 97, positioning arms, disc drive etc.) is assumed to be 23.59 megabits/second.

Synchronization in the scanning system shown is derived from the disc system itself. A primary clock rate of approximately 28.62 megabits/second is formed by the timer block 100 in conjunction with the disc and is used to control the recording of information thereon from buffer 98. This clock rate, which will also be synchronous with data read from the disc 97, is counted down in timer (or clock) 100, to produce appropriate 2-phase AC signals to drive a synchronous scanner motor 40, the Y scan mirror drive motor 52 and appropriate clock signals to synchronizing buffer 98. The clock signal from scan clock generator 94 (used to control the timing of data that modulates the laser beam on output scanning and to sample the photodetector signals on input scanning) is generated in bursts, under the control of the start-of-scan and end-of-scan photodetectors 82 and 84, respectively. The scan clock generator 94 is therefor slaved to the speed of polygon 28 which in turn is derived from the disc system 96, the scanning system timing therefor being synchronized with the disc speed. The input scan speed relationships are chosen to cause data to be generated at an average rate equal to the ability of the disc 97 to store it. If the rotational speed of disc 97 was to change slightly, the scanner 28 and scan clock 94 will follow the change. This synchronous system timing method allows the size of the synchronizing buffer 98 to be significantly reduced in size (and cost) and substantially less than the capacity of one helical turn on the disc 97 (as will be set forth hereinafter, one turn of the disc 97 is capable of storing 4 (surfaces) $\times 48$ (sectors per turn) $\times 4096$ (bits per sector), which is 48 times less than the size of the synchronizing buffer which preferably will be utilized). Synchronizing buffer 98 is required in the embodiment shown in the figures since the peak data rate during input scan is approximately 38 megabits/second, which is higher than the rate that disc 97 can accept the input data (approximately 28 megabits/second). The average bit rates over a number of scan lines, however, will be approximately equal. Further, synchronizing buffer 98 smooths out any gaps between sectors on disc 97, the sectors including 4096 data bits, the system controller 90 preventing gaps (and sector headings, labels, etc.) recorded on the magnetic disc 97 from being stored in the synchronizing buffer during the print mode of operation.

The time to scan an original on the input platen 62 (see FIG. 1) is selected to be the same as the time required to expose the xerographic drum 76 in xerographic processor 77 to reduce the time required for output and the size of synchronizing buffer 98.

The following relationships are given to provide an indication of system performance. The following definitions are useful.

ABR=Average bit rate for magnetic disc 97 (bits/sec)
BPS=Bits per scan line
BPP=Bits (pixels) per page
CPPS=Clock pulses per sector for the magnetic disc 97
DBC=Disc data capacity in bits
DPC=Disc data capacity in pages
DR=Divide ratio for generating polygon drive frequence
$L_P$=Output paper length (in.) (Parallel to axis of xerographic drum 76.
$L_S$=Input platen scan length including overscan (in.) (assumed to be 17.885 in.)
M=Magnification ratio (1.0 to 0.61)
N=Number of facets on the polygon scanner 20 (assumed to be 26)
$SD_i$=Input scan density (lines/inch or bits/inch)
$SD_o$=Output scan density (lines/inch or bits/inch)
SLS=Scan lines per second
$SPBR_i$=Peak input scan bit rate (bits/sec)

$V_d$ = Xerographic drum surface velocity (in/sec) (assumed to be 12 ips)
$V_P$ = Polygon angular velocity (rpm)
$V_y$ = Scan velocity (in/sec.)
$W_P$ = Output paper width (in.)

Therefore, from the geometrics and characteristics of the system, the following is obtained:

(a) Output scan density
$SD_o = [ABR/(V_d)(L_p)]^{\frac{1}{2}}$ (b) Polygon rpm required for output scan
$V_P = 60(SD_o)(V_d)/N$.

(c) Bits (pixels per output page)
$BPP = (SD_o)(W_P)(SD_o)(L_P)$ (d) Input scan density
$SD_i = (SD_o)(M)$ or $M = SD_i/SD_o$ (e) Input Y scan velocity
$V_y = V_d/M$ or $M = Vd/Vy$; SDi being inversely proportion to Vy (f) Scanner rpm required for input scan
$V_p = 60(SLS)/N = 60(SD_i)$ $(V_Y)/N = 60$ $(SD_o)(V_d)/N$.

(g) Scan lines per second
$SLS = N(V_P)/60 = (SD_o)(V_d)$.

(h) Peak input scan bit rate
$SPBR_i = (SLS)(L_s)(SD_i) = (M)(L_s)(V_d)(SD_o)2$.

(i) The total number of pages that may be stored on the disc
$DPC = DBC/BPP = DBC/(SD_o)^2(W_P)(L_P)$ The following summarizes some of the system characteristics for 8½ × 11″ output paper.

TABLE I

| | |
|---|---|
| Average bit rate (mbps) | 23.59 |
| Output scan density (lpi) as determined by the speed of drum 76 and the disc clock rate | 422.77 |
| Output scanner velocity (rpm) | 11,707 |
| (Bits/11″ line | 4,650.47 |
| Megabits/output page | 16.71 |
| Storage Capacity of Disc in pages | 48.19 |
| Peak input rate (mbs) | 38.30 |

If a maximum reduction factor of 0.61 is assumed, the input scan density in lines/inch and bits/inch is reduced from 422.77 to 257.89. The output copy from xerographic processor 77 is still produced at the maximum scan density of 422.77 scan lines per inch. The total number of pixels per output page is constant and independent of magnification and therefore allows for a simple and effective way of controlling magnification by controlling input scan density.

The input Y direction scan mirror velocity is increased from 12 inches/second to 19.67 inches/second for the 0.61 magnification ratio. The peak input bit scan rate accordingly drops from 38.30 megabits/second to 23.36 megabits/second.

When larger output paper is used, the scan line density and disc page storage capacity are reduced. Table II lists system characteristics wherein 10.12″ × 14.33″ output paper is used. Note that since the bit rate is fixed and the paper area is larger than in the Table I example, the output scan density will be less.

TABLE III

| | |
|---|---|
| Average bit rate (mbps) | 23.59 |
| Output scan density (lpi) | 370.41 |
| Output scanner velocity (rpm) | 10,257 |
| Bits/14.33″ line | 5,307.91 |
| Megabits/output page | 19.89 |
| Storage capacity in pages | 40.47 |

TABLE III-continued

| | |
|---|---|
| Peak input rate (mbs) | 29.40 |

At a reduction ratio of 0.61, the input scan density becomes 225.95 lines/inch with output scanning remaining at 370.41 scan lines per inch.

Although the invention described herein is preferably utilized to provide for electronic precollation (precollation being provided in simplex operation by copying the number of input originals in sequence onto the disc 97 or other image storage media and printing a predetermined number of copies of each sequence via the xerographic processor 77), it should be obvious that by changing control parameters and the software used by the microprocessor 90 that many additional features may be provided i.e. providing a small alphanumeric display for interactive guidance for the system user; a small portion on the large disc capacity can be used to store statistics on system use; the disc could be used to store software diagnostic routines to be used by the microprocessor 90 for trouble diagnosis; a scan density compatible with easy conversion to facsimile could be selected, etc.

Figure 3A:
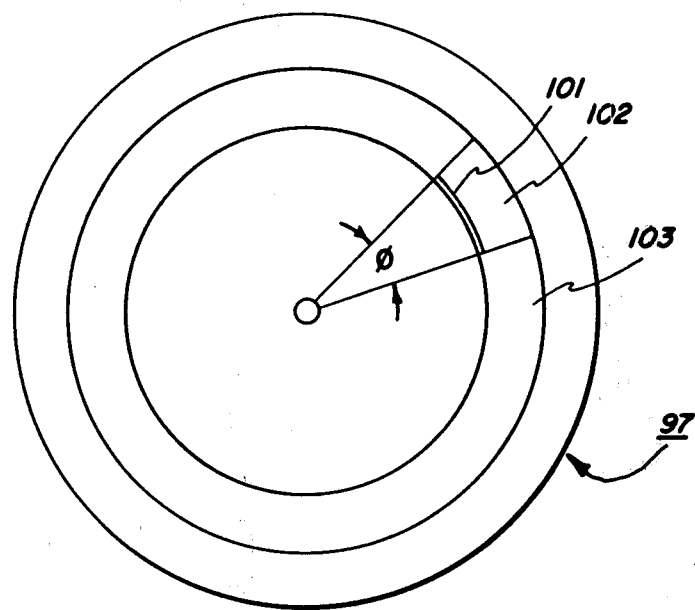
FIGS. 3A and 3B illustrate a disc surface and a typical recording pattern formed on the disc which may be utilized in the present invention.
Figure 3B:
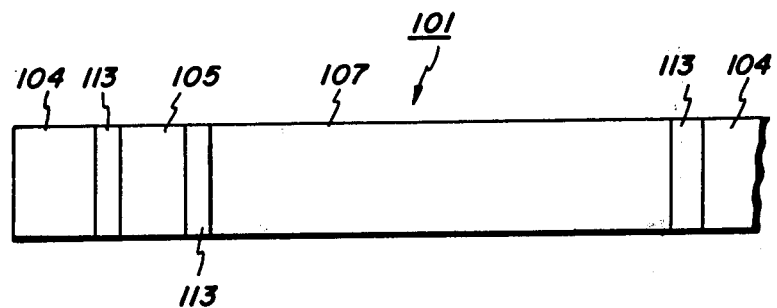

The disc 97 to be utilized with the present invention is assumed to comprise two platters (four surfaces) recorded and read in parallel, one surface 99 of which is illustrated in simplified form in FIG. 3A. The data is recorded, for example, in 1024 discontinuous sectors 101 within angular area 102, 48 such angular areas being formed in band area 103 around the disc circumference (approximately 50,000 sectors thereby being provided). Each sector 101 is subdivided into 3 main sections. The first section contains a space 104 for a fixed header identifying the sector number. The second section 105 is a rewritable control area of 128 useful bits identified as "label". The third section 107, separated from section 104 by gap 111, is the normal data area of 4096 data bits. There are 48 such sectors per turn, each sector being separated by gaps 113. Information is preferably recorded in a spiral (helical) pattern (similar to a phonograph record) with a total of 1024 active data turns. The spiral type pattern (track) allows data to be read continuously with the disc read/write heads 116 following the track as in a phonograph record. The header area 104 of each sector may be arranged to contain a pattern that is used to servo control the radial position of the recording-playback head to allow it to follow the spiral data path.

The number of circumferential clock periods (not shown in the figure) required in each section for gaps, header and label (error detection and correction bits may be provided if desired) is assumed to be 872. Therefore, the total sector length is 4968 clock periods. Table III summarizes typical performance characteristics for the disc system 96:

TABLE III

| | |
|---|---|
| Data bits/sector (each surface) | 4,096 |
| Clock periods/sector | 4,968 |
| Data bits/sector (4 surfaces) | 16,384 |
| Sectors/turn | 48 |
| Turns/surface | 1,024 |
| Data bits/turn (on each surface) | 196,608 |
| Data bits/turn (4 surfaces) | 786,432 |
| Average data bit rate/surface (mbs) (30 × 48 × 4096) wherein the disc rotation rate is 30 revolutions per second | 5.89 |
| Average bit rate of 4 tracks (msb) | 23.59 |

TABLE III-continued

| | |
|---|---|
| Peak bit rate/surface (mbs) 30 × 48) (4096 + 872) | 7.15 |
| Total peak bit rate (mbs) | 28.61 |
| Total data capacity (bits) | 805,306,365 |

Although not considered part of the present invention, it should be noted that the large size of the data blocks in this system make the use of isolated and burst error detecting and correcting codes efficient and attractive.

The seek operation wherein the radial disc arms seek the starting sector on the disc 97 is defined by specifying a unique sector number out of the total of 49, 152 sectors along the spiral track by the system controller 90 and having a controller specified acceleration motion to enable the disc arms to locate the correct sector. New information (representing images in this system) is written directly over old data without a separate erase pass to save system time.

Figure 4A:
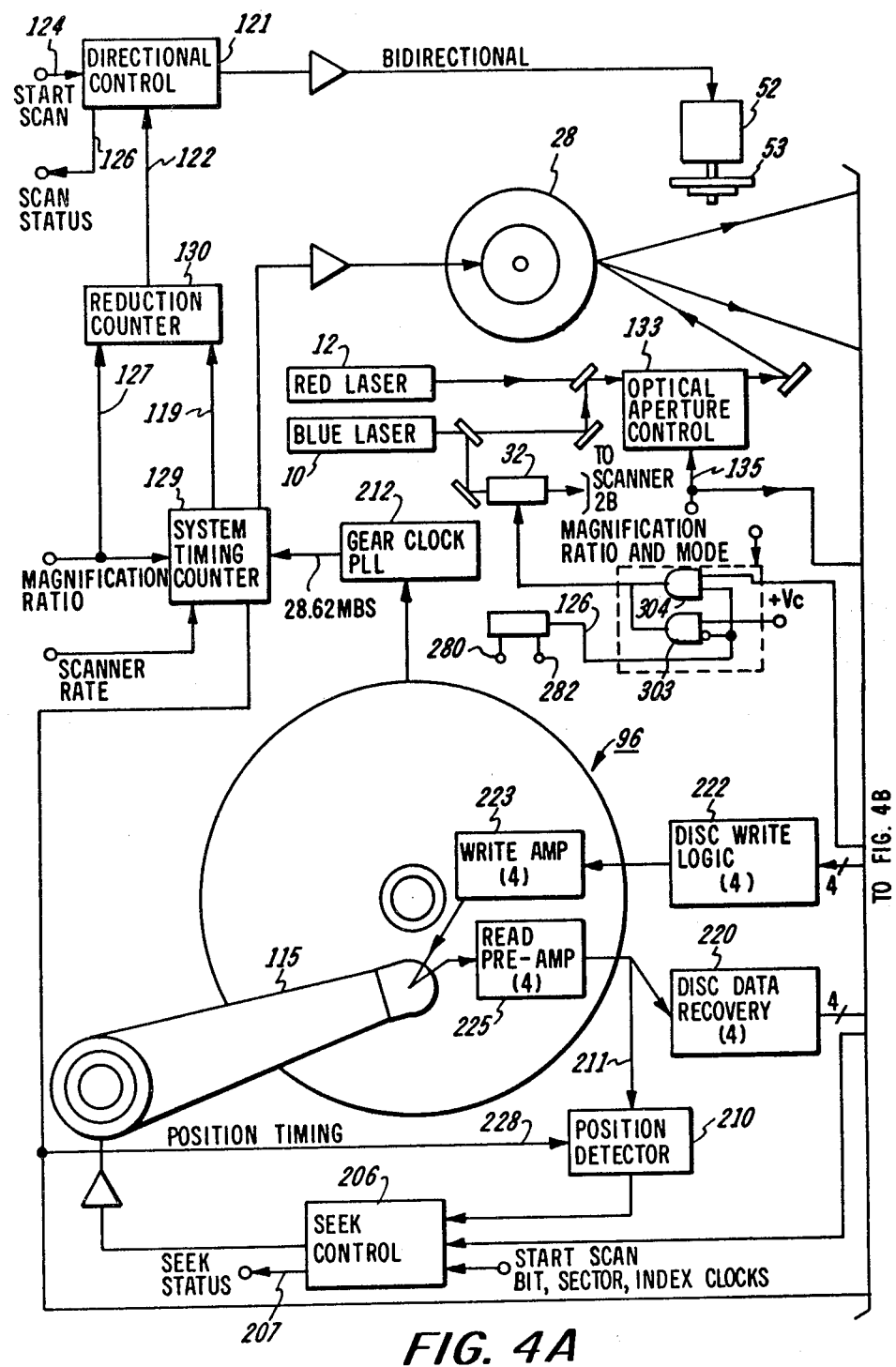
FIGS. 4A and 4B are more detailed block diagrams of the system of the present invention.
Figure 4B:
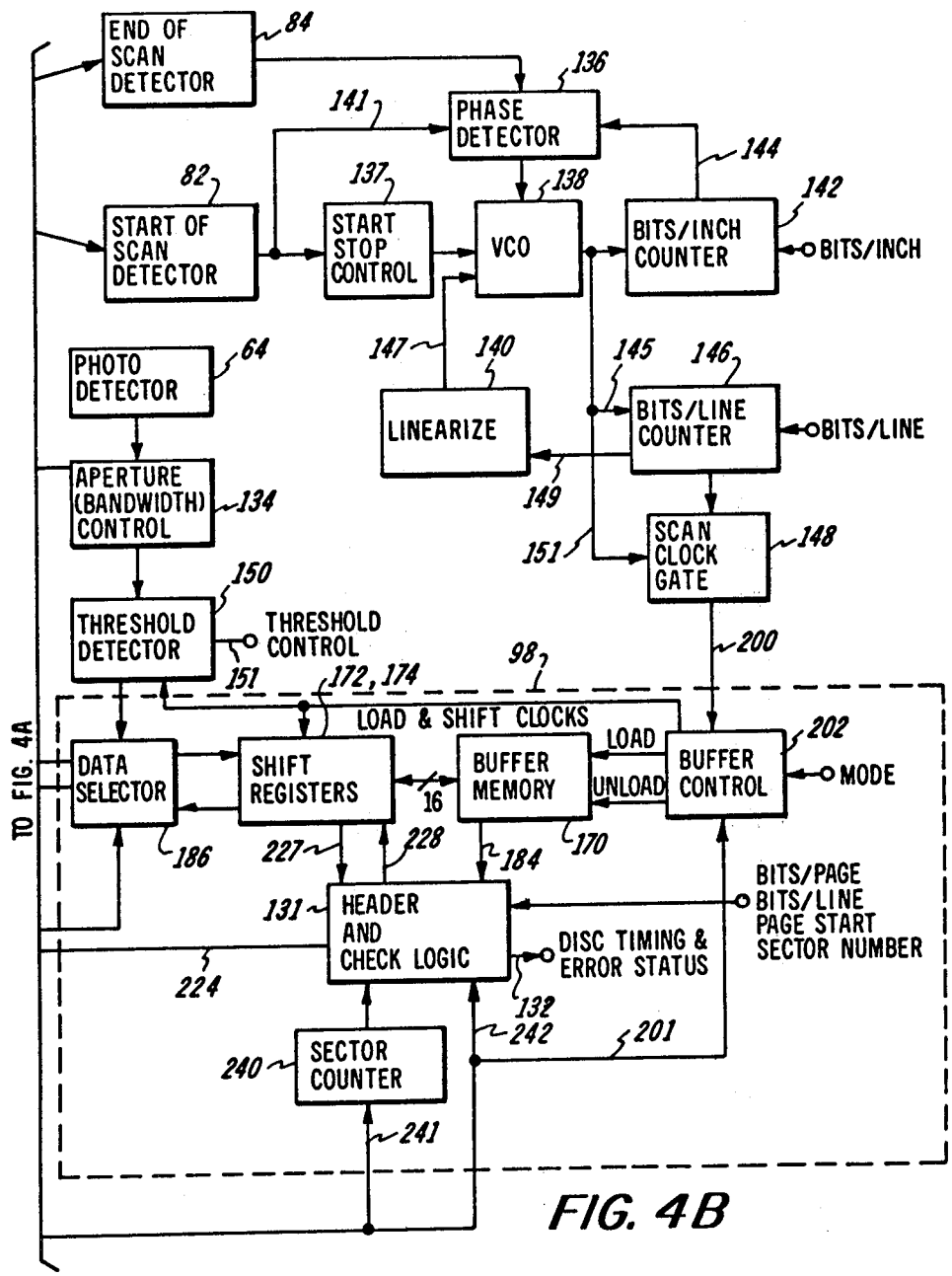

FIGS. 4A and 4B, read together, is a more detailed block diagram of the present invention. It should be noted that signals to and from the microcode programmed microprocessor system controller 90 are indicated in the figures by circles adjacent to a label of a function entering or coming from a particular electronic subsystem block.

Direction control device 121 receives an input (Y scan drive frequency) on lead 122 from reduction counter 130, the system controller 90 introducing the signal "start scan" on lead 124. The velocity and direction of the Y scan motor 52 are set up by the system controller 90. The scan velocity (Y scan drive frequency) is determined by the "magnification ratio" control parameter on lead 127 specified by an operator via panel 92 (FIG. 2) which is used to determine the clock frequency division ratio in the system timing counter 129 (logically a set of counters, the count ratio being changed by the selected magnification ratio) and the reduction counter 130. The magnification ratio signal is applied to reduction counter 130 via lead 127 a reduced clock signal being applied thereto from system timing counter 129 via lead 119. The direction control device 121 causes a Y scan pass to be initiated after the "start scan" signal and direction information are provided by the system controller 90 the direction information being initially set up by an operator via panel 92. Logic circuits within direction control device 121 determine the proper polarity of the Y scan drive waveforms applied to motor 52 for the correct direction of scan. In the normal (non-inverted mode) it is assumed that the Y direction of scan is in the +Y direction from an initial position 61 (FIG. 1) whereas in the inverted mode of operation the Y direction of scan is in the −Y direction from initial position 63.

The start of Y scan time is derived by the system controller 90 from information it has about the starting sector number for the next page of information to be entered into the disc 96 during input scanning. The system controller 90 receives information about where the disc 96 is as it rotates from the header and check logic block 131 on output lead 132. The controller 90 checks the Y scan status from the direction control block on lead 126 prior to initiating a start scan command to be sure the scanner is in the correct home, or initial, position. The correct home position obviously is dependent upon whether scanning is to proceed in the normal or reversed modes of operation.

It should be observed that since the input scan line density must be changed (reduced) to vary the magnification ratio, it is preferable to change the size of the scan spot for input scanning, in order that the scanning spot cover the entire area of the document thereby maintaining the optimum ratio of scanning aperture size to scan line density. To increase the Y dimension of the scan spot optically (anamorphically), optical aperture control 134 is utilized during input scanning, the aperture control increasing the size of the scanning spot in the Y direction associated therewith via a signal from system controller 90 on lead 135. On input scanning, the effective X dimension of the spot (in the direction of high speed scan) may be controlled by changing the electronic bandwidth of the aperture control 134 following the photodetector 64 via a signal from system controller 90 on lead 135. During output scanning, the effective size of the spot in the X direction (which is maintained essentially constant since the output scan line density is maintained constant) is controlled by the timing of signals supplied to the acousto-optic modulator 32 via lead 125 under control of the scan clock generator 94.

As set forth hereinabove with reference to FIG. 1, a blue and red laser 10 and 12 are assumed for input scanning to avoid color blindness which would occur if monochromatic illumination were used. In the system shown, both lasers are used for input scanning, and the blue laser is used for output scanning.

Although it would be cost effective to use a single polygon X scanner 28 for both input and output scanning, it may be preferable to use a second polygon which utilizes a separate 2-phase synchronous drive motor.

In the single scanner design, one pair of scan synchronizing detectors will normally suffice i.e. end-of-scan detector 84 and start-of-scan detector 82. Signals from these two devices allow the generation of precisely controlled streams of "bit clocks" for sampling the signal from photodetector 66 on input scanning or controlling the timing of image data fed to the laser modulator 32 on output scanning. It should be noted that the system mode of operation (whether input scanning or output printing) is determined by the operator via panel 92. The scan clock frequency is controlled by phase detector 136, start-stop control device 137, voltage controlled oscillator 138, linearizer 140, and bits/inch counter 142.

The voltage controlled oscillator 138, oscillating at a preset frequency, does not operate continuously, but is released to start oscillating on each scan by the start of scan pulse and is stopped at the end of scan via start/stop control 137. The phase comparison in phase detector 136 is also initiated when the start of scan pulse is received via lead 141. The count down ratio of the bits/inch counter 142 is set by the system controller 90 according to the operator selected magnification ratio and output paper size utilized. The preferred range is from approximately 423 bits/inch to approximately 226 bit/inch (input scan onto 14.33 paper at magnification of 0.61). When the preset number of bits or voltage cycles (bits/inch times the input scan length including overscan) from oscillator 138 have been counted in the bits/inch counter 142, a pulse is coupled to the phase detector 136 via lead 144. If the average signal frequency from oscillator 138 is correct, a pulse will be received from the end of scan detector 84 at the same time. If, for example, the polygon 28 had speeded up slightly, the end of scan pulse will arrive at the phase detector before the bits/inch counter pulse on lead 144. This will cause the phase detector 136 to generate a voltage error signal to increase the frequency of oscillator 138. Note that there are 26 such samples of scanner rotation rate for each rotation of the scanner 28 since it has been assumed that scanner 28 comprises 26 facets.

The bits/line counter 146, synchronized by oscillator 138 via lead 145, counts down from a preset count which corresponds to the various sizes of output paper to which the developed image formed in the xerographic processor 76 is transferred by standard techniques in the preset mode. The range (count) is 4656 to 5312 bits/line which is less than the range of counter 142 since the latter count is preset on the basis of the input platen scan line length and including overscan. These numbers are slightly larger than those listed in Tables I and II in order to be compatible with the operation of the synchronizing buffer 98, the number of bits/line being rounded upward to the nearest multiple of 16.

The linearizer 140 generates a second input to oscillator 138 via lead 147, to correct for non-uniform velocity of the scan spot, the bits/line counter 146 providing a signal to linearizer 140 via lead 149 to provide an indication where in the scan line the spot is located at any instant. It has been observed that the instantaneous scan velocity normally is higher at the edges of a scan than at the center of the scan. Even though the input and output scan nonlinearities might compensate each other, electronic linearity correction of the image data stored in the disc by scan clock variation may be preferable to allow later coupling between machines with different scan geometries.

The scan clock gate 148 releases precisely timed bursts of clock pulses on lead 200 at the start of its countdown cycle ranging in frequency from 38.30 to 17.93 megabits/second as determined by the system controller 90 (output paper size and magnification ratio). The number of pulses in the clock burst is determined by the countdown ratio set in counter 146. The scan clock gate 148 is used to control the timing of loading the synchronizing buffer assembly 98 with signals from the photodetector 66 in the input scanning mode, the unloading of the synchronizing buffer 98 to the disc system 96 for input scanning being under the control of the disc clock, to be described hereinafter.

The threshold detector 150, with its input control parameter on lead 151 is used in sample signal processing operations to produce, in effect, extremely high gamma. A threshold slicing level may be modified under user control to help remove background and otherwise clean up inferior originals. Existence of the image information in electronic form makes possible a wide range of image enhancement techniques.

The timing of the entire scanning system is slaved to the disc clock. On input scanning, signals from the photodetector 66 will come in bursts since (for 11" paper) the active scan time is only 11/17.855 of the total scan line period for the case of no reduction. This produces a peak input scan bit rate (SPBR$_1$) of 38.30 megabits/second. Similarly, the disc input and output data flows in bursts to compensate for the overhead necessary for sector gaps, headers and labels. The peak disc data rate is 28.62 megabits/second. Therefore, total peak instantaneous bit rate for the synchronizing buffer is 38.30 plus 28.62 megabits/second. The average input rate is equal to the average output rate for most modes of oepration and is equal to 23.59 megabits/second. An exception occurs when the reduced image of the 14"×17" input platen is smaller than the output paper size, as determined by the operator selected magnification ratio and paper size. In that case, "white border bits" are generated to fill the output page as is described hereinafter.

FIG. 5 shows some of the functional blocks enclosed in the dotted outline corresponding to the synchronizing buffer 98 of the block diagram of FIGS. 4A and 4B. The buffer storage 170 required to accommodate the bursts of data is assumed to be made up of 16, 1K random access memory (RAM) chips. Each input and each output operation of the RAM handles 16 bits in parallel. It is assumed that chips operating at 200 nanoseconds full cycle time will be utilized. This will provide a peak rate of 80 megabits. Serial to parallel shift register 172 and parallel to serial shift register 174 make the necessary conversions at input and output, respectively, for the random access memory 170.

For the non-inverted first-in, first-out operation mode of operation, a load address counter 180 selected by address selection gates 181, sequences through the 1024 addresses in RAM 170, sequentially and circularly to load data therein from the threshold detector 150 in the input scanning mode of operation. Similarly, an unload address counter 182 provides sequential unload addresses for the RAM 170 under control of address selection gates 181 when data is to be unloaded to the disc 97.

The data selector 186 comprises parallel/digital gates 185 (FIG. 5) that switch the input and output bit streams to and from the synchronizing buffer 98. For each input scanning, the peak input scan bit rate clock on lead 200 controls the input shift register 172 via the shift register clocks on lead 206 and load address counter 180 timing via the load/unload clocks on lead 204. The peak bit rate disc clock on lead 201 controls output shift register 174 via lead 206 and unload address counter 182 timing via lead 204. The threshold detector 150 (FIG. 4B) is the input data source to the data selection gates 186 via input shift register 172 and holding register 173, the output timing data from RAM 170 going to disc 97. Similarly, for output scanning (printing) the disc clock on lead 201 controls the input to RAM 170 via shift register 172 and load timing via load address counter 180 while the scan clock on lead 200 controls the output of RAM 170 via output shift register 174 and the unloading address counter timing via counter 182.

Figure 6:
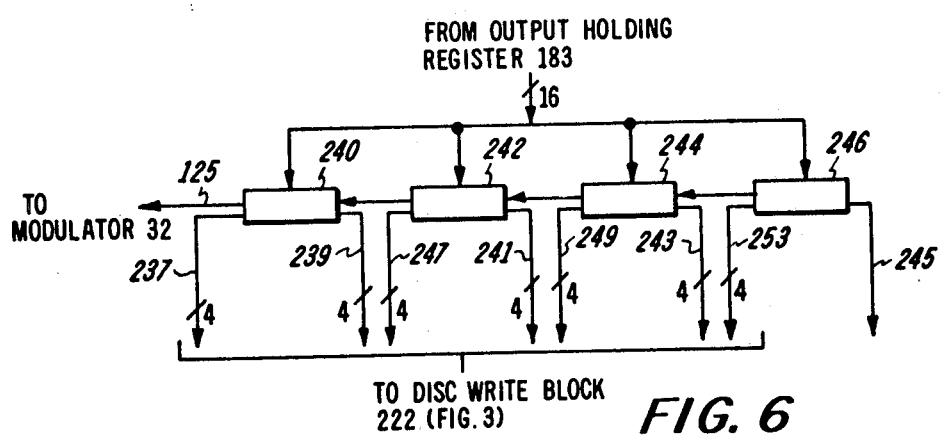
FIG. 6 is a more detailed block diagram of an output shift register which may be utilized in the present invention.

When a bound volume is placed on the input platen 62, successive pages of the volume may be placed upside down on the platen to make use of the book edge feature incorporated in copiers commercially available. In order to reverse the image so that all pages will be right side up when the output is generated, the X and Y scan directions both must be reversed (scan inversion is accomplished by operator selection of a "Scan Invert" button (not shown) on panel 92. Note that if only the Y scan direction were reversed a mirror image of the document scanned would be reproduced). Although the Y scan direction control device can be changed by appropriate control of the Y scan direction control device 121 thereby resetting the initial start position and direction of scan, mechanically changing the X scanning direction is not feasible due to the inertia and high operating speeds of the scanner 28. The X-scan direction is therefor reversed electronically as follows: For an 8½×11" input document, it is assumed that approximately 291 sixteen bit words comprise one scan line in the 11 inch X-scan direction. During the input scan (the system is assumed to be in the inverted input scanning mode) load address counter 180 via address selection gates 181 causes the input scan information from photodetector 66 (291 sixteen bit words) to be stored in sequence, for example in storage locations 0 through 290 in RAM 170, at least one complete scan line being stored therein. Lead 230 is appropriately energized to allow storage to be accomplished when the store mode of operation is selected. Preset address counter 179 is caused to be set to a first preset address 290 in the inverted mode of operation, a signal on lead 177 causing the unload address counter 182 via address selection gates 181 to count down sequentially from storage location 290 (i.e., 289, 288, ...) such that the scan line information is read out word by word in the reverse order in which it was stored, an appropriate control signal being applied to lead 230 to enable RAM 170 to be read out. The information read out is coupled to output shift register 174 via lead 175, data selection gates 186, and output holding register 183 and thereafter to disc 97. As shown in FIG. 6, output shift register 174 is coupled to the 16-bit output holding register 183 and comprises four shift registers 240, 242, 244 and 246. When information is to be recorded on discs 97 an appropriate control signal from system controller 90 is applied to register 174 on lead 250 to enable the information to be read in four-bit blocks to be applied to the disc write block 222 and thereafter to be applied to the 4 recording surfaces of the discs 97 via write amplifiers 223 (FIG. 4). When the information read out from RAM 170 is to be applied to modulator 32 and thereafter reproduced by xerographic processor 76, the signal on lead 250 enables the information to be read out serially on lead 125. In a similar manner although not shown in the figure, input shift register 172 is adapted (via a signal from system controller 90 on lead 251) in the input scan mode to convert the input serial data stream into 16-bit parallel format and to convert the four bit word from the discs 97 via amplifiers 225 and data recovery circuits 220 into 16-bit parallel words in the print (write) mode.

The next scan line is recorded in locations 291 through 580 in RAM 170 and the peset address counter 179 is set to address 580, the data in these addresses being read out in a manner as described hereinabove with reference to locations 0 through 290.

In the inverted mode of operation, the bits in output shift register 174 are shifted from left to right and read out on lines 239, 241, 243 and 245 whereby each bit in the scan line is transposed for reverse scanning. In the normal (non-inverted) mode of operation, the bits in each scan line are shifted right to left and read out on lines 237, 247, 249 and 253 with no transposition of the bits comprising the scan line occurring. In other words, shift register 174 is bidirectional, data bits being shifted out right-to-left in the inverted mode of operation whereas the data bits are shifted left to right in the normal FIFO (first in, first out) mode of buffer operation. It should be noted that input shift register 172 need not be bidirectional since, in the print mode of operation, the transposed bits stored on the discs 97 will be in the correct sequence when read out.

When the system is in the print mode, as determined by operator energization of a "PRINT" button on panel 92 (not shown), the output from discs 97 is read out via read pre-amplifiers 225 and initially stored in memory 170 in the address specified by load address counter 180, counter 180 being selected by address selection gates 181 to store information in RAM 170. To unload data to the modulator 32, unlead address counter 182 is selected by gates 181 and caused to transfer the information in RAM 170 via data selection gates 186 and output holding register 183 to output shift register 174. It should be noted, as set forth hereinabove, that since the scan lines have already been reversed prior to being stored on disc 97, unload address counter 182 is not caused to count down by a signal from buffer control 202 on lead 177. The data which is being read out therefor is electronically reversed in the x-scan direction.

The scan clock on lead 200 is utilized to control the timing of loading the RAM 170 with signals from the photodetector 66 on input scanning, the unloading of the RAM 170 being controlled by the clock signal derived from the disc system 96 on lead 201. For output scanning, the loading of the RAM 170 is controlled by the clock signal from disc system 96 whereas the unloading of the RAM 170 is controlled by the scan clock signal on lead 200. The load and unload address clocks are applied to lead 204 and shift register clocks are applied to lead 206 via synchronizing buffer control 202.

The header and check logic 131 (FIG. 4) is connected to the shift registers 172, 174 via leads 227 and 228 to enable the acquisition and loading of header and control information from the data stored in the shift registers. The system controller 90 will supply header and check logic 131 with the following parameters: Lines/page, bits/line, and page start sector number which in turn modifies the data stored in the RAM 170 with this information prior to loading the disc 97. Since four surfaces of the disc are used in parallel, the basic disc data block is $4 \times 4096 = 16,384$ data bits which correspond to the timing of one disc sector. Since the largest number of bits in a scan line may be greater than 4096 data bits, the start of successive scan lines may not occur at sector boundaries. It is assumed that the first scan line of each page may start at a sector boundary identified by the page start sector number.

The label information associated with each sector may identify the number of lines remaining in the current page and the location of the boundaries between successive scan lines for each sector. This information can be thought of as completely defining the format and other relevant information about the data to follow.

The header and check logic block 131 will check sector identification and will preferably also verify data integrity by generating and comparing error detection and correction redundancy patterns by standard computer techniques although this does not form part of the present invention. Sector number checking is aided by the availability of the current sector position of the disc derived from the system timing counter 129 of FIG. 4 which supplies sector pulses (48 pulses per disc revolution) to sector counter 240 via lead 241 (approximately 50,000 total for 1024 turns). As shown, pulses from timing counter 129 are also applied to buffer control 202 (approximately 28.2 megabits/sec) and header and disc logic 131 (one index pulse per disc revolution) via leads 201 and 242, respectively. The clock for disc data recovery circuit 220 is derived from the recorded data during a read operation, the clock for the disc write logic circuits 222 being derived from the system timing counter 129 during recording. Each of the four independent data recovery circuits 220 will generate its independent read timing clock although the disc system timing clock controls the combined output data stream as it is passed to the main synchronizing buffer 98.

The header and check logic 131 will issue sector number commands to the seek control block 206 via lead 224 that controls the positioner (not shown) for disc arms 115. Seek complete status is indicated to the system controller 90 via lead 207 when the commanded sector has been acquired by the seek control 206. The system controller 90 can then issue the start scan signal to the seek controller 206 to allow the disc heads to follow the spiral track either for recording or playback of the disc data.

The position detector 210 generates radial head position error signal (i.e. radial deviation from the helical track) from the playback voltage on lead 211 which may be generated by the position control pattern permanently recorded in the fixed header segment of each sector. Timing for this operation is derived from the system timing counter 129 via lead 228.

The gear clock PLL 212 is a phase locked loop frequency multiplier used to generate the 28.62 megabit/second basic system timing signal. The input for this block is derived from a multi-toothed gear mounted to the disc drive hub, (a plurality of teeth corresponding to each of the 48 sectors per turn) a magnetic detector pickup mounted on the disc support structure generating a pulse as each tooth rotates therepast, a pulse stream thereby being generated having a frequency proportional to the rotational speed of disc 96. A typical input to gear clock phase locked loop 212 is 192 pulses/second. In order to provide the required maximum system pulse rate of 28.62 mbs, gear clock 212 multiplies the input pulse rate by a factor of approximately 5500. The detector is separated from the recording discs 97 and is always available whether the disc system 96 is reading or writing. It is to be noted that system timing counter 129 supplies a plurality of pulse signals, including pulse rates reduced in frequency from the 28.62 mbs input on its output counter leads to provide appropriate timing signals to the various system elements. For example, a frequency of 100 cycles is generally required to drive motors 40 and 52. The count ratio of counter 129 is varied by the magnification ratio on lead 128.

Three basic modes of operation are involved in the operation of the present system. The first is a preparatory one noted as job set up, the second is a input scanning where originals are scanned and written on the disc, the third is output scanning where copies are produced xerographically.

During the job set up, the system controller 90 furnishes a starting sector number for the first page. The disc seek control 206 will find that sector issued by header and check logic 131, and then set up the idle mode holding pattern and indicate a seek complete condition to the system controller 90 on lead 207. Similarly, the proper timing ratios will have been issued to cause the scanner 28 rpm to be selected and stabilized. The scan clock phase locked loop will be generating the correct number of bits/inch and bits/scan line for the selected magnification ratio and output page size, the proper scan clock thereby being applied to lead 200. The header control logic 131 will have been set up with the bits/scan line and scan lines/page parameters. The controller 90 will generate the sector number to start each page, and these will be provided sequentially to the seek control 206 as the job progresses in order to allow for electronic precollation. The controller 90 has been given the number of pages/book and the number of books (copies)/job by the user through the control panel 92.

The controller 90 may derive or be told by the operator of the simplex/duplex status of each output page and computes appropriate page start sector numbers to provide the optimum sequence for duplex output production (if the xerographic processor 77 is capable of duplex operation).

After the job is set up, the input scanning operation can proceed. The operator places his first original on the platen and pushes either the "Normal" or "Invert" scan button on panel 92. This causes the system controller 90 to initiate a scan on either the +Y or −Y direction (FIG. 1) at an initial starting position. The Y scan motor 52 will start with a lead time (with respect to the arrival of the page start sector number of the disc) to allow the Y scan mirror to accelerate and stabilize at the selected velocity (as determined by the selected reduction ratio) and depending on normal or reverse scan direction, both parameters being operator initiated. As was mentioned hereinabove for reverse scanning, one or more complete scan lines must be loaded into the synchronizing buffer 98 prior to the arrival of the page start sector at read heads of the disc. At this time, the disc system 96 will demand output from the buffer 98 in inverted (or LIFO) mode. The data flow into the buffer 98 from the photodetector 66 is timed according to the scan clock synchronization circuits and is not determined by the position of the Y scan drive motor 52. Variations in the position of the Y scan mirror at the start of electrical scan are equivalent to a shift in the position of the original on the platen (in the Y direction) and do not affect the synchronizing buffer. A position detector can be provided to check the timing of this operation to allow the system controller 90 to adjust the lead time parameter.

The system runs to the end of the page and the disc system 96 seeks the next page start sector number. If the input scanning is being done for simplex output printing, the next page will start at the next sector following the last sector used in the previous page. For duplex output, appropriate page start position interlace will have been generated by the system controller 90. That is, the sequence of pages along the spiral track on disc 96 will be arranged during input scanning for the benefit of high throughput output.

Operation during the third mode, output scanning, is similar. In the idle condition, the disc system 96 acquires the page start sector. The paper feed from either the duplex recirculation paper path or the normal paper supply path from xerographic processor 77 can be triggered on demand from the system controller 90. Collation is then done electronically as each page is read from the disc in sequence to form a book, the number of books that will be generated being dependent on operator selection of the appropriate buttons on panel 92.

Interleaved input and output may be required, for example, when a job requiring 25 copies of a 13-page original has been loaded and the system is in the output (print) mode. The operator then wishes to load a new job. This fact, plus the other normal job set up quantities are entered via the control keyboard 92 and the first original of the new job is placed on the platen 62. When the start button is pushed, the system controller 90 finishes printing the output page in process and then momentarily interrupts the output printing operation. The system controller 90 resets the scan clock rate and an input scan takes place. The system then immediately resumes output printing while the operator changes to the next original on the input platen, the process being repeated until the first job is completed and all the originals of the new job have been scanned.

The following sets forth an analysis of some of the factors that may be utilized to determine the size of synchronizing buffer 170 and the system timing relationships and considers the case of input scanning, using 8-½×11″ output paper size and the normal (no reduction) mode. This appears to place the most stringent demands on the size of buffer 170. Table IV hereinbelow lists some data, (times being in microseconds and bit rates in megabits/second) for the system described hereinabove.

TABLE IV

| | |
|---|---|
| Total sector time $10^6/30 \times 48$ | 694.44 |
| Active sector time 16, 384/28.61 | 572.55 |
| Inter sector time (assumed gap time) | 121.89 |
| Total scan line time $60 \times 10^6/(N)$ $(V_p)$ | 197.11 |
| Active scan line time 4656/38.30 | 121.58 |
| Inactive scan line time | 75.53 |
| Total bits/scan line | 4,656 |
| Total bits/sector | 16,384 |
| Number of scan lines/sector | 3.51 |
| Peak bit rate to disc | 28.62 |
| Peak bit rate from scanner | 38.30 |

The most stringent demands made on synchronizing buffer 170 is in the inverted page mode where at least one complete scan line must be loaded into the buffer memory 170 prior to removal of information for the disc 97. The minimum lead time for information supplied to the buffer memory from the input scanner that is required to prevent the disc unload requirements from overtaking the data available in the buffer should be determined.

Time will be measured, in the following calculation, with respect to the instant, time $t_o$, that data bits must be supplied to the disc 97 from the buffer 170. The time to load the 4656 bits of the first scan line into the disc 97 is $$4656/28.62 = 162.71 \text{ microseconds.}$$

The disc therefor accepts a line of data in less than the 197.11 microseconds total scan line time. Therefore, when disc 97 is ready to receive the beginning of the fourth scan line near the end of the first disc section which will occur at $$t_4 = 3 \times 162.71 = 488.12 \text{ microseconds}$$

after $t_o$, the input scanner at $t_4$ must have loaded four complete scan lines into the buffer 170. The time required to load n scan lines into the buffer is given by $$n (197.11) - 75.53$$

If TL denotes the lead time in microseconds with respect to the start of the data block $(t_o)$, $$4 (197.11) - 75.53 - TL = 488.12,$$
$$TL = 224.79.$$

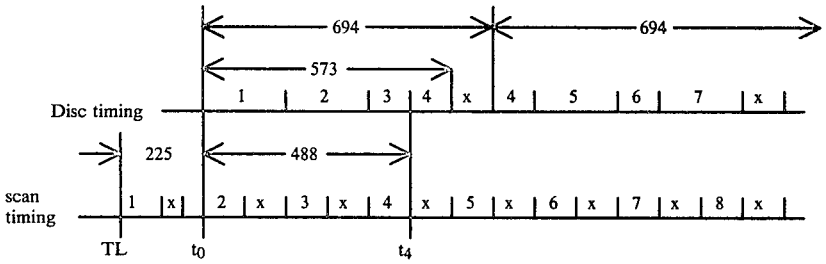

1, 2, 3 . . . represent scan line numbers (both disc and scan), x represents inactive time.

Thus, TL represents the latest start time at which input scan signals may start to enter the synchronizing buffer 170 measured with respect to time $t_o$, the initiation of the unload to the disc, the unload initiation process being controlled by buffer control 202.

The earliest start time is determined by the upper limit on the size of buffer 170. After feeding three scan lines into the buffer without removing any information for the disc 96 there will be $(16,384 - 3 \times 4656) = 2416$ bit positions left in the buffer 170. The start of transfer to the disc 96 from the buffer $(t_o)$ will occur at some time during the loading of the fourth scan line into the buffer 170. Prior to $t_o$, the net input rate to the buffer 170 will be 38.30 megabits/second input. The differential input rate after $t_o$ will be

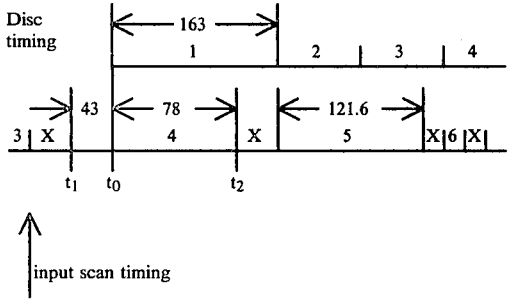

The active time for scanning the fourth scan line (121.58 microseconds) can be divided into two intervals, $t_1 + t_2$.

$$t_1 + t_2 = 121.58.$$

The total net increase in bits contained in the buffer 170 during the input of the fourth scan line cannot exceed the remaining capacity of the buffer 170 (2416 bits). Therefore, $$t_1 \times 38.30 + t_2 \times 9.68 = 2416.$$

$$t_1 = 43.30 \text{ microseconds.}$$

The earliest lead time that the scanning input can start is, therefore, $$TE = 3 \times 197.11 + 43.30 = 634.63 \text{ microseconds.}$$

The optimum lead time with respect to $t_o$ normally would be considered to be the average of the earliest and latest lead times, i.e. 430 microseconds. However, the scan line start times precess with respect to the disc sector start times. The optimum enable time for allowing the input scanner to start loading will leave the buffer 170 equal margins before the earliest allowed time and after the latest possible occurring time (after enable). These possible data load start times are separated by one total scan time or 197.11 microseconds. Thus, if m=margin time, $$2m+197.11=643.63-244.79.$$

$$m=110.87$$

Therefore, for the case of 8-½×11″ output paper size inverted scanning, no reduction, the optimum time to initiate input scan loading of the synchronizing buffer 170 is TE−m=532.77 microseconds before $t_o$.

An example of how the normal first-in first-out operation might function during non-synchronous interlaced load and unload cycles is set forth hereinafter. Assume again the 8-½×11″ output paper, no reduction, input scan case. 16-bit words will be available in the input data holding register 173 (FIG. 5 at intervals of $$16/38.3=0.4178 \text{ microseconds.}$$

This information must be loaded into the RAM 170 at some time before the next 16-bit data word is assembled in the input shift register, i.e. before 417.8 nanoseconds having elapsed.

Similarly, the output shift register 174 will require a new 16-bit word from its output holding register 183 at intervals of $$16/28.62=0.55905 \text{ microseconds.}$$

If there is a coincidence in the time at which an input word is ready and an output word can be accepted, input is given priority, since inputs come faster, when simultaneous requests for RAM operation occur. Table V illustrates (in simplified terms neglecting logic delays of a few nanoseconds) a possible sequence of events. For this example, it is assumed that an internal sync buffer logic clock on lead 201 running at 57.24 mega pulses/sec instead of the 28.62 megabits per second set forth hereinabove is made available by the gear clock phase locked loop 212.

Therefore, internal events can be initiated only at the times of occurrence of these clock pulses or about every 17.47 nanoseconds. Each RAM memory cycle (either store (load) or read (unload)) is assumed to take 200 ns. Assume that the memory cannot be recycled until at least the second clock pulse occurs following the completion of any memory cycle or after any new non-synchronous memory cycle request is generated. The times listed for completion of memory cycles, and also for the availability of input words, are not synchronous with the internal buffer clock and are designated as "NS" in the table. In this arrangement, RAM output requests will occur synchronously at intervals of 32 internal clock periods.

For purposes of identification, the input words being loaded are designated as 101, 102, etc., while the words being unloaded are 1, 2, 3 etc.

TABLE V

RAM (FIFO) Timing Example

| Internal Clock Pulse Number | Time nsec | RAM Operation | Holding Register State | |
|---|---|---|---|---|
| | | | Input | Output |

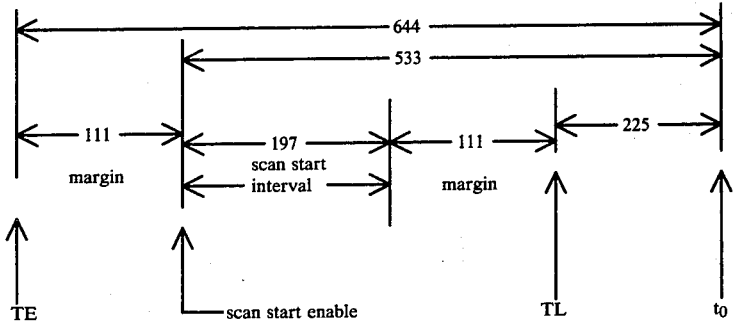

| 0 | 0 | resync. | 101 ready | 1 ready |
| 1 | 17.5 | start load 101 | | |
| NS | 217.5 | end load 101 | empty | |
| 13 | 227.1 | resync. | | |
| 14 | 244.6 | start unload 1 | | |
| NS | 417.8 | | 102 ready | |
| NS | 444.6 | and unload 1 | | empty |
| 26 | 454.2 | resync. | | |
| 27 | 471.7 | start load 102 | | |
| 32 | 559.0 | | | 2 ready |
| NS | 671.7 | end load 102 | empty | |
| 39 | 681.3 | resync. | | |
| 40 | 698.8 | start unload 2 | | |
| NS | 835.6 | | 103 ready | |
| NS | 898.8 | end unload 2 | | empty |
| 52 | 908.4 | resync. | | |
| 53 | 925.9 | start load 103 | | |
| 64 | 1118.1 | | | 3 ready |
| NS | 1125.9 | end load 103 | empty | |
| 65 | 1135.6 | resync. | | |
| 66 | 1153.0 | start unload 3 | | |
| NS | 1253.4 | | | |
| NS | 1353.0 | end unload 3 | | empty |
| 78 | 1362.7 | resync. | | |
| 79 | 1380.1 | start load 104 | | |
| NS | 1580.1 | end load 104 | empty | empty |
| | | *No activity - waiting for request* | | |
| NS | 1671.2 | | 105 ready | |
| 96 | 1677.1 | resync. | | 4 ready |
| 97 | 1694.6 | Start load 105 | | |
| NS | 1894.6 | end load 105 | empty | |
| 109 | 1094.2 | resync. | | |
| 110 | 1921.7 | start unload 4 | | |
| NS | 2089.0 | | | 106 ready |

The point to notice is that the FIFO sequence catches up with the combined input and output tasks at 1580.1 nsec after the start of the example. It waits for the generation of a new request which comes at 1671.2 nsec when a nonsynchronous load request is generated, and the pattern starts to repeat.

An input scan timing problem occurs when the reduction ratio causes the reduced image of the input to be smaller than the output paper size. The size of the original(s) on the platen 62 is of no concern if the cover is closed. The video signal variation due to the difference in reflectivity of the platen cover and the unmarked areas of the paper can be set below the slicing level of the threshold detector 150 and should not be noticable.

Figure 7A:
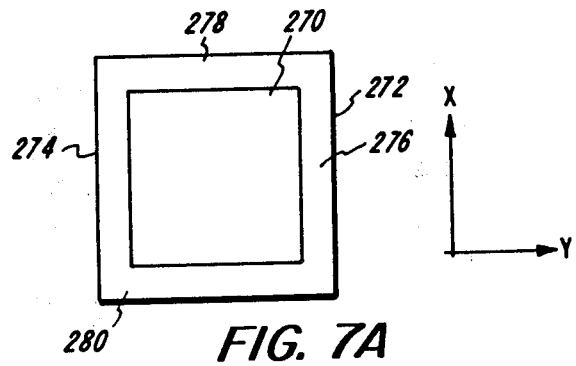
FIGS. 7A and 7B illustrate how a reduced image may be centered on an output medium.

FIG. 7(a) is a representation of a reduced image 270 formed on output paper 272 (this can also correspond for example, to the electrostatic dot pattern formed on drum 76 within the xerographic processor 77). As can be seen, in order to center the image 270 on output paper 272, the left hand and right hand borders (as viewed from the paper) 274 and 276, respectively, and the upper and lower borders 278 and 280, respectively, must be appropriately generated to center the image 270.

Figure 7B:
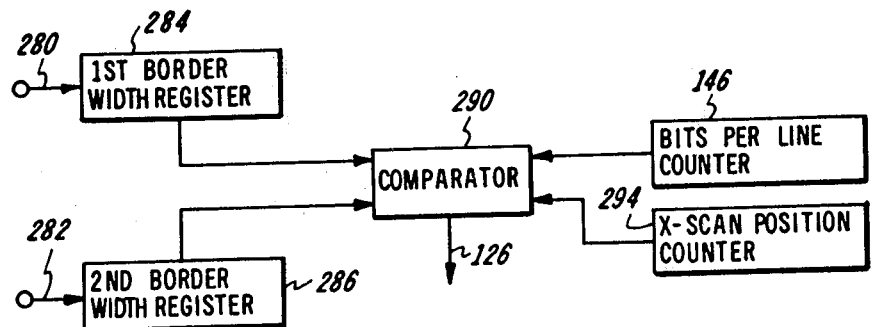

FIG. 7(b) shows apparatus which may be utilized to center the image 270 shown in FIG. 7(a). The system controller 90 via leads 280 and 282, loads registers 284 and 286, respectively, with appropriate data (dependent on magnification ratio and output paper size) relating to the borders 274, 276, 278 and 280. For the X input scan direction, a problem arises if $17M < L_p$. For 11" paper, this is $M < 0.65$ ($M < 0.84$ for 14.33" paper). In these cases, there would be fewer input bits available than is required for one output scan line ($SD_o$) ($L_p$), the input scan bit rate being less than the average disc bit rate.

Register 284 is therefor loaded with appropriate data corresponding to borders 278 and 280, the output of register 284 being compared in comparator 290 with information regarding the X position of scan from bits per line counter 146. Register 286 is similarly loaded by microprocessor 90 via lead 282 and is compared with the Y position of scan from Y scan position counter 294 (i.e. compares the scan position with the known border conditions). When 17(M) Lp (determined by system controller 90), the necessary "white margin zeros" are split equally between the beginning and end of each scan line, the output on line 126 being correspondingly controlled. Referring to FIG. 4A, the output on lead 126 is coupled to a logic device 300 which comprises AND gates 301 and 303. The output on lead 126 is coupled to one input of AND gate 301 and to an inverting input of AND gate 303. The output from data selection gates 186 is applied to the other input of AND gate 301 whereas a voltage Vc is applied to the other input of AND gate 303. When lead 126 is low, AND gate 303 is enabled and passes the voltage Vc to the modulator 32 to cause the laser 10 to generate the necessary white margins (the beam from laser 10 discharges the appropriate margin areas of drum 76). If lead 126 is high, gate 303 is disabled, gate 301 is enabled and the data signals on lead 125 passes to modulator 32 to modulate the laser light from laser 10 to reproduce collated pages in xerographic processor 77.

Although not shown in the figures, the Y scan position counter 294 is adapted to cooperate with the shaft of motor 52 in a known manner to provide signals representing the Y position of the scan line.

Similarly, for $14(M) < W_p$, the width of the platen, as reduced, is less than the output paper width, when $M < 0.61$ for 11" paper (or $M < 0.72$ for 14.33" paper). for this situation register 286 is appropriately loaded with data corresponding to borders 274 and 276, a string of completely blank scan lines being generated both before and after the Y scan starts and finishes producing valid data within the width of the image on drum 76.

These procedures will center the reduced image of the platen area on the output page. The surrounding white borders will be electronically generated by causing the laser to perform the function of an adjustable fade out lamp.

It should be noted that the drive frequency for the 2 pole polygon motor 40 is $V_p/60$ Hz. In order to generate a 2-phase quadrature motor drive signal, a quadruple frequency clock rate is required. The correct value will cause scan bits to be generated at the average data rate of the disc. Then $$(BPS)(N)(V_p)/60 = ABR.$$

wherein BPS is the bits per scan line rounded upwards. The peak bit rate of the disc 96 is related to the average bit rate by the ratio of the number of clock pulses/sector, CPPS, to the data bit times per sector or CPPS/4096. The polygon drive frequency divide ratio, DR, is selected such that $$[(CPPS)(ABR)/4096]/DR = 4 (V_p)/60 = 4 (ABR)/(BSL)(N).$$

$$DR = (CPPS)(BSL)(N)/16,384.$$

with CPPS=4968, BSL=4656, N=26, DR=36,707.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. A scanning system having the capability of scanning originals having images formed thereon in either a normal or inverted mode of operation such that electrical signals representing the scanned images can be stored in storage means such that when the scanning system reads the stored representations of the images to reproduce the images on a recording medium the reproduced images each having the same image sense comprising:

first means for scanning said originals in a first direction in the normal mode and in a second direction, opposite to said first direction, in the inverted mode, second means for scanning said originals in a third direction, which is orthogonal to said first and second directions whereby said originals are completely scanned with light, means for converting the light reflected from said originals into corresponding electrical signals as the originals are scanned on a line to line basis, buffer memory means for storing said electrical signals in the order in which the electrical signals are generated, and means for unloading said electrical signals stored in said buffer memory means into said storage means in a sequence determined by whether the scanning system is in the inverted or normal mode of operation.

2. The system as defined in claim 1 wherein the system is in the inverted mode and further including means for unloading the electrical signals stored in said buffer memory into said storage means in the reverse order, on a scan line to scan line basis, from which the electrical signals were stored in said buffer memory.

3. the system as defined in claim 2 wherein the electrical signals representing each scan line comprises binary digits grouped into a plurality of words, each word in the scan line being read into said storage means in the reverse order in which it was stored in said buffer memory.

4. The system as defined in claim 3 further including means for reversing each bit in said word before being stored in said storage means.

5. The system as defined in claim 4 wherein a plurality of words are stored in said storage means corresponding to a completely scanned image and further including means to read out said stored image from said storage means in a manner to reproduce said image on said recording medium, the image formed on said recording medium having the same image sense as an image which would be reproducd on said recording medium if the system was in the normal mode of operation.

6. The scanning system as defined in claim 1 wherein said scanning light is produced by laser means.

7. The scanning system as defined in claim 1 wherein said originals are supported on an input platen.

* * * * *